United States Patent [19]

Ivanchev et al.

[11] 4,216,024
[45] Aug. 5, 1980

[54] PROCESS FOR PRODUCING MINERAL FILLERS WITH GRAFT PEROXY GROUPS FOR POLYMERS

[76] Inventors: Sergei S. Ivanchev, ulitsa Nalichanaya, 36/3, kv. 97, Leningrad; Nikolai S. Enikolopov, Kutuzovsky, prospekt, 26, kv. 425, Moscow; Boris V. Polozov, prospekt Smirnova, 20/3, kv. 32, Leningrad; Anatoly A. Syrov, ulitsa III Internatsionala, 52, kv. 51, Leningrad; Oleg N. Primachenko, Suzdalsky prospekt, 38/1, kv. 13, Leningrad; Zorislav N. Polyakov, ulitsa Petra Smorodina, 18, kv. 8, Leningrad, all of U.S.S.R.

[21] Appl. No.: 962,205

[22] Filed: Nov. 20, 1978

[30] Foreign Application Priority Data

Dec. 6, 1977 [SU] U.S.S.R. .................. 2546853

[51] Int. Cl.$^2$ .................. C09C 1/28
[52] U.S. Cl. .................. 106/308 Q; 106/287.15; 106/288 B; 106/309; 260/42.15; 556/400; 556/445; 556/478; 427/219; 427/337; 428/405; 428/406; 526/194
[58] Field of Search .......... 106/287.15, 308 Q, 288 B, 106/309; 260/42.15, 448.8 AS; 526/194; 427/219, 337; 428/404, 405, 406, 407

[56] References Cited

U.S. PATENT DOCUMENTS

| | | | |
|---|---|---|---|
| 3,629,297 | 12/1971 | Antonen | 260/37 SB |
| 3,929,502 | 12/1975 | Hodgkin et al. | 106/308 Q |
| 3,963,512 | 6/1976 | Swift et al. | 106/308 Q |

FOREIGN PATENT DOCUMENTS

1456865 12/1976 United Kingdom .................. 260/42.15

OTHER PUBLICATIONS

Reviews in Polymer Technology, Ed. by I. Skeist 1, NYC (1972) pp. 1–49.
Mod. Plast. Intern. 6, No. 6 (1976) pp. 28,31.
Plueddeman, E. P. et al. "Role of Coupling Agents in Surface Modification of Fillers"-Modern Plastics 8/1977.

*Primary Examiner*—Helen M. McCarthy
*Attorney, Agent, or Firm*—Lackenbach, Lilling & Siegel

[57] ABSTRACT

The process for producing mineral fillers with graft peroxy groups for polymers according to the present invention comprises treatment of mineral fillers, at a temperature of from 50 to 150° C. under a pressure of from $1.33 \cdot 10^2$ to $4 \cdot 10^5$ Pa (1mmHg to 4 atm), with an organosilicon compound of the formula:

$$R_{4-y}SiX_y \text{ or } R'R_{3-z}SiX_z, \text{ wherein}$$

R is vinyl, allyl, norbornyl,
X is chlorine, an alkoxy or acyloxy,
y = 1–3,
z = 1–2,
R' is methyl, ethyl, propyl, whereafter the mineral filler containing graft unsaturated groups is separated from the reaction mixture, dried and ozonized with an ozone-oxygen mixture containing 4 to 6 vol.% of ozone at a temperature of from −40° to +20° C.

The process for producing mineral fillers with graft peroxy groups for polymers is technologically simple and makes it possible to perform extending and grafting of a polymer at lower temperatures (50°–140° C.).

2 Claims, No Drawings

PROCESS FOR PRODUCING MINERAL FILLERS WITH GRAFT PEROXY GROUPS FOR POLYMERS

FIELD OF THE INVENTION

The present invention relates to the production of mineral fillers (extenders) and, more particularly, to a process for producing mineral fillers containing graft peroxy groups and intended for use with polymers. Such fillers are useful for the manufacture of extended polymers possessing improved mechanical properties, increased aging-resistance under severe conditions and applicable as a construction material in the automobile industry, radio- and electrical engineering, civil engineering.

BACKGROUND OF THE INVENTION

Reinforcement of extended polymers has recently become a problem of great importance due to an increasing demand for high-strength polymeric materials. The use of reinforcing fillers (such as glass fiber, mineral fiber, metals, metal oxides and the like) improves properties of polymers. An essential property of high mechanical strength extended polymers is sufficient adhesion between a filler and a polymer. To ensure higher adhesion various substances are used which are referred to as sizing agents.

Sizing agents are monomeric bifunctional compounds capable of interaction both with a mineral filler and a polymer. Fillers (extenders) are treated with sizing agents either by application of the latter onto the filler surface or by treating fillers with the sizing agent vapors, or by mixing with a powder-like sizing agent.

After such treatment the filler is incorporated into a polymer. Besides, a sizing agent may be directly introduced into a polymer, wherein it migrates to the surface of a filler during the mixing process. Thus-extended polymers have improved mechanical properties, increased aging-resistance under severe conditions. (cf. G. D. Andrievskaja "High-strength oriented glass plastics", M., "Nauka" Publishing House; coll. of rev. and transl. from foreign periodicals, Moscow, MIR Publishing House, 1968; Express-information "Synthetic polymer materials", No. 36, 38, 1976).

Known in the art is a process for producing mineral fillers containing graft unsaturated or saturated groups or other reactive groups and intended for polymers such as polystyrene, polyethylene, polypropylene which comprises treatment of said fillers, at a temperature within the range of from 50° to 150° C., with sizing agents, i.e. silicone compounds of the formula:

wherein R is an organic functional group capable of reacting with a polymer; X is a halogen, an alkoxy or acyloxy group; y=1, 2, 3; followed by separation and drying of the treated mineral filler (cf. Reviews in Polymer Technology, Ed. by J. S. Keit, Vol. 1, No. 4, 1972, p. 1–49).

However, to produce extended polymers with satisfying physico-mechanical properties, it is necessary to select sizing agents containing specific groups R and X defined by the type of filler and polymer. Furthermore, the compounds employed as sizing agents cannot be used, due to the structure thereof, for a simultaneous combination of two polymers having different natures.

Known in the art is a process for producing mineral fillers containing graft peroxy groups and intended for polyethylene, polysulphones which comprises treatment of said fillers with a sizing agent of the formula: $CH_2=CHSi[OOC(CH_3)_3]$ which is an organosilicon peroxide. This sizing agent is applied to a mineral filler which is then compounded with a polymer at a temperature within the range of from 175° to 230° C. As a result, upon heating, the peroxide forms free radicals serving as initiators for grafting the polymer onto the filler (cf. Mod. Plast. Intern., 6, No. 6, 28, 31, 1976).

This prior art process has a disadvantage residing in a limited field of application of such sizing agents due to a high temperature of decomposition of the organosilicon peroxide. This sizing agent is readily hydrolyzed by the air humidity and necessitates specific storage conditions. Furthermore, synthesis of this sizing agent is a quite complicated and expensive process.

SUMMARY OF THE INVENTION

It is an object of the present invention to provide a process for producing mineral fillers with graft peroxy groups for polymers which would make it possible to lower temperature of grafting of the polymer onto the filler with a simultaneous amelioration of physico-mechanical properties of the extended polymer.

This object is accomplished by a process for producing mineral fillers with graft peroxy groups for polymers which involves treatment of mineral fillers with an organosilicon compound, wherein in accordance with the present invention as the organosilicon compound use is made of a compound of the formula:

wherein

R is vinyl, allyl, norbornyl;
X is chlorine, an alkoxy or acyloxy;
y=1–3, z=1, 2
R' is methyl, ethyl, propyl, and the treatment of a mineral filler with said organosilicon compound is effected at a temperature within the range of from 50° to 150° C. under a pressure of from $133.10^2$ to $4.10^5$ Pa, (1 mm Hg to 4 atm) whereafter a mineral filler containing graft unsaturated groups is recovered from the resulting reaction mixture, dried and ozonized with an ozone-oxygen mixture containing 4 to 6 vol.% of ozone at a temperature within the range of from −40° to +20° C.

To improve properties of the peroxidized mineral filler, the ozonation is performed in a medium of a liquid saturated hydrocarbon or a haloderivative thereof.

DETAILED DESCRIPTION OF THE INVENTION

The present invention is embodied in the following manner. A mineral filler dried to a constant weight is treated in an autoclave with organosilicon compounds of the formula:

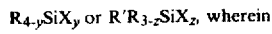

R is vinyl, allyl, norbornyl;
X is chlorine, an alkoxy or acyloxy;
y=1–3, z=1–2, R' is methyl, ethyl, propyl.

As mineral fillers use is made of commercially available compounds, i.e. aerosil which is silica with a particle size of from 10 to 40 mcm and a specific surface area of $175\pm25$ m$^2$/g, perlite which is a compound consisting of SiO$_2$ (65 to 75% by weight), Al$_2$O$_3$ (10 to 15% by weight), Fe$_2$O$_3$, CaO, MgO being the balance with a particle size of from 40 to 100 mcm, glass fibers, metal oxides, asbestos. Temperature in the autoclave is elevated to 150° C. and the mixture is maintained for a period of from 2 to 10 hours while varying pressure from $1.33.10^2$ to $4.10^5$ Pa (1 mm Hg to 4 atm). The mineral filler may be treated both with vapors of organosilicon compounds and 2-5% solutions of organosilicon compounds in toluene, decane. On completion of the treatment, the resulting mineral filler is washed with a solvent to remove the unreacted organosilicon compound and dried at a temperature within the range of from 20° to 120° C. As solvents employed for washing of the product for the removal of residual amounts of the reagents, low-boiling hydrocarbons are used, i.e., pentane, hexane petroleum ether. The thus-prepared product has graft unsaturated groups which are determined by means of a "Double-bond Analyser". The amount of said graft unsaturated groups is within the range of from 0.1 to 5% by weight of the total weight of the filler. Then the treated mineral filler with graft unsaturated groups is subjected to ozonation with a mixture of ozone and oxygen containing 4 to 6 vol.% of ozone at a rate of from 40 to 60 l/hr at a temperature within the range of from $-40°$ to $+20°$ C. Furthermore, ozonation may be performed in a medium of a liquid saturated hydrocarbon or a haloderivative thereof. Ozonation time depends on the required amount of peroxy groups. In the case of ozonization of a mineral filler with graft unsaturated groups in a liquid phase, on completion of ozonation the reaction product is filtered and dried at a temperature of not above 40° C. under a pressure of from $1.33.10^2$ to $1.0.10^5$ Pa (1 mm Hg to 1 atm). As a solvent for ozonation use is made of carbon tetrachloride, pentane, heptane, decane, heavy petroleum ether, trifluorochloroethylene, chloroform, methylene chloride, dichloroethane, perchloroethylene. The final product, i.e. a mineral filler is characterized by the presence of graft peroxy groups containing active oxygen determined by iodometric titration. The content of graft groups in the final filler amounts to 0.2-2% by total weight of the filler.

The thus-produced mineral filler containing graft peroxy groups may be used for the manufacture of extended polymers such as polyethylene, polypropylene, ABS-type polymers, polystryrene, polyvinylchloride. An advantage of said fillers resides in that they may be introduced into a polymer at lower temperatures (within the range of from 50° to 140° C.). The use of said fillers does not impair physico-mechanical properties of the extended polymers. Moreever, the process technology for the production of mineral fillers containing graft peroxy groups is more simple and safe due to the use of the ozonation stage for incorporation of peroxy groups.

For a better understanding of the present invention some specific Examples illustrating the process for producing a mineral filler containing graft peroxy groups for polymers are given hereinbelow.

EXAMPLE 1

Into a reaction vessel provided with a reflux condenser there are charged 100 g of aerosil comprising silica with a particle size of from 10 to 40 mcm and a specific surface area of $175\pm25$ m$^2$/g and 10 g of vinyltrichlorosilane. Then the reaction vessel is set under vacuum to a residual pressure of $5.3.10^3$ Pa. and heated at a temperature of 50° C. for two hours. On completion of the reaction the excessive amount of vinyltrichlorosilane is washed with dry petroleum ether and the product of the formula:

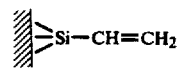

is dried under normal conditions. The amount of unsaturated groups in the mineral filler is equal to 1% of the total weight of the filler.

100 g of aerosil with graft unsaturated groups are placed into a reaction vessel, added with 1,000 ml of carbon tetrachloride and an ozone-oxygen mixture containing 4 to 6% vol.% of ozone is bubbled therethrough at a rate of 40 to 60 l/hr at the temperature of 20° C. for 30 minutes. On completion of a reaction the product is separated by filtration and dried at a temperature of from 20° to 30° C. to constant weight. The resulting product, i.e. a mineral filler containing graft peroxy groups has the formula:

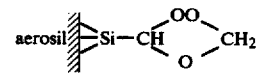

The content of active oxygen determined iodometrically is as follows: found 0.51% by weight, calculated 0.53% by weight.

EXAMPLE 2

The procedure of Example 1 hereinbefore is repeated, except that the treatment of aerosil with graft unsaturated groups is effected with an ozone-oxygen mixture for 5 minutes. The resulting product, i.e. a mineral filler containing graft peroxy groups has the formula:

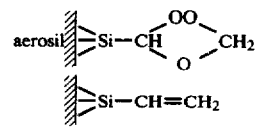

The content of active oxygen determined iodometrically is as follows: calculated—0.27% by weight, found—0.28% by weight.

EXAMPLE 3

The procedure of Example 1 is repeated, except that instead of vinyltrichlorosilane use is made of vinyltriethoxysilane. The amount of graft unsaturated groups in the mineral filler is equal to 1.5% by the total weight of the filler.

The product resulting from ozonation, i.e. a mineral filler containing graft peroxy groups has the following formula:

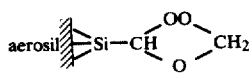

The content of active oxygen determined iodometrically is as follows: found—0.37% by weight, calculated—0.40% by weight.

EXAMPLE 4

Into a reaction vessel provided with a reflux condenser there are charged 100 g of aerosil having a composition similar to that described in the foregoing Example 1 and contacted with 1,000 ml of decane containing 15 g of trichlorosilylnorbornene; the reaction mixture is maintained at a temperature of 150° C. for 4 hours. On completion of the reaction the product is separated by filtration, washed with petroleum ether and the resulting product, i.e. mineral filler, is dried. The product has the formula:

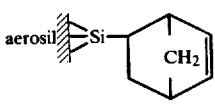

The amount of graft unsaturated groups in the mineral filler is equal to 1.55% by the total weight of the filler.

100 g of aerosil with graft unsaturated groups are placed into a reaction vessel, contacted with 1,000 ml of carbon tetrachloride and an ozone-oxygen mixture containing 4 to 6 vol.% of ozone is bubbled therethrough at a rate of from 40 to 60 l/hr for 30 minutes at a temperature of 20° C.

On completion of the reaction the product is filtered-off and dried at a temperature of from 20° to 30° C. to constant weight. The resulting product, i.e. mineral filler containing graft peroxy groups has the formula:

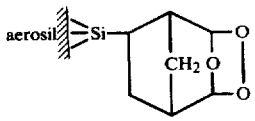

The content of active oxygen determined iodometrically is as follows: found—1.07% by weight; calculated—1.11% by weight.

EXAMPLE 5

Glass fibers with a size of 4-5 mm and diameter of 3 to 5 mcm are treated with hot carbon tetrachloride to remove the greasing agent and dried in vacuum (residual pressure of $1.33 \cdot 10^2$ Pa) at a temperature within the range of from 250° to 300° C.

100 g of the glass fibers are placed into a reaction vessel, added with 10 g of trichlorosilylnorbornene, set under vacuum to the residual pressure $1.33 \cdot 10^2$ Pa, and maintained at a temperature of 150° C. for 4 hours. On completion of the reaction the excessive amount of trichlorosilylnorbornene is washed out with the use of dry petroleum ether; the desired product is filtered off, dried at the temperature of 120° C. under a pressure of $1.33 \cdot 10^2$ Pa. The resulting mineral filler has the formula:

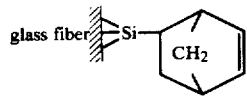

The amount of graft unsaturated groups in the mineral filler is equal to 3.06% of the total weight of the filler.

Ozonation is conducted following the procedure described in the foregoing Example 1. The thus-prepared product, i.e. mineral filler containing graft peroxy groups has the formula:

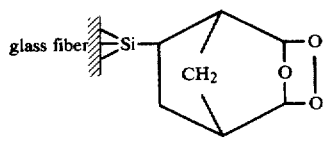

The content of active oxygen determined iodometrically is as follows: found—2.05% by weight, calculated 2.19% by weight.

EXAMPLE 6

The procedure of the foregoing Example 5 is repeated, except that the treatment of glass fibers with graft unsaturated groups (3.06% by weight) is effected with an ozone-oxygen mixture. The resulting product, i.e. mineral filler containing graft peroxy groups has the formula:

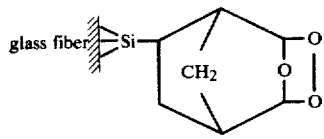

The content of active oxygen determined iodometrically is as follows: found—1.95% by weight, calculated—2.19% by weight.

EXAMPLE 7

The procedure of Example 5 is repeated, except that instead of glass fiber use is made of a glass fabric with a thickness of 0.3–0.5 mm and as a solvent n-hexane is used. The amount of graft unsaturated groups in the mineral filler is equal to 1.93% by the total weight of the filler. The product obtained after ozonation, i.e. mineral filler containing graft peroxy groups has the formula:

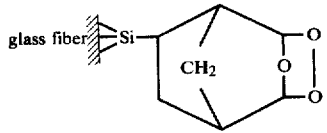

The content of active oxygen determined iodometrically is as follows: found—1.35% by weight, calculated—1.38% by weight.

EXAMPLE 8

Perlite comprising a compound of the composition: $SiO_2$ (65-75% by weight), $Al_2O_3$ (10-15% by weight), $Fe_2O_3$, CaO, MgO (the balance) with a particle size of from 40 to 100 mcm is treated with a diluted 5% hydrochloric acid for one hour at room temperature to remove 10-15% of superficial layers, then washed with distilled water to a neutral reaction to remove hydrochloric acid and dried in vacuum (residual pressure of 1.33.10² Pa) at a temperature within the range of from 150° to 200° C. Application of chlorosilane (the amount of graft unsaturated groups in the mineral filler is equal to 1.5% by the total weight of the filler) and ozonation is conducted following the procedure of the foregoing Example 1. The product obtained after ozonation comprises a mineral filler containing graft peroxy groups and has the formula:

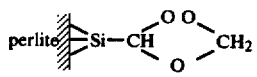

The content of active oxygen determined iodometrically is as follows: found—0.78% by weight, calculated 0.80% by weight.

EXAMPLE 9

The process is conducted as described in Example 1 hereinbefore, except that a ozonation is effected in the medium of pentane at the temperature of −20° C. The product obtained after ozonation, i.e. mineral filler containing graft peroxy groups has the formula:

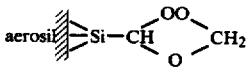

The content of active oxygen determined iodometrically is as folows: found—0.52% by weight, calculated—0.53% by weight.

EXAMPLE 10

The process is performed as described in Example 1 hereinbefore, except that the ozonation is effected in a medium of heptane at a temperature of 0° C. The product obtained after ozonation, i.e. mineral filler containing graft peroxy groups has the formula:

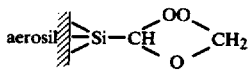

The content of active oxygen determined iodometrically is as follows: found—0.50% by weight, calculated 0.53% by weight.

EXAMPLE 11

Into a reaction vessel provided with a reflux condenser there are charged 100 g of aerosil with a composition similar to that described in the foregoing Example 1, added with 1,000 ml of toluene containing 15 g of triethoxysilylnorbornyl and the reaction mixture is maintained at a temperature of 120° C. for a period of 8 hours. On completion of the reaction the product is separated by filtration, washed with petroleum ether and the desired product, i.e. mineral filler, is dried. It has the following formula:

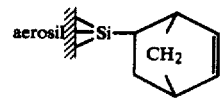

The amount of graft unsaturated groups in the mineral filler is equal to 1.54% by the total weight of the filler. Ozonation is performed following the procedure described in Example 4 hereinbefore. The thus-obtained product, i.e. mineral filler containing graft peroxy groups has the formula:

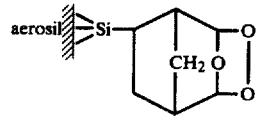

The content of active oxygen determined iodometrically is as follows: found—1.10% by weight, calculated 1.11% by weight.

EXAMPLE 12

The process is effected in a manner similar to that of Example 8 hereinbefore, except that the ozonation is conducted in a medium of a heavy petroleum ether (comprising a fraction of saturated hydrocarbons with 7 to 9 carbon atoms) at a temperature of 20° C. The product resulting from said ozonation, i.e. mineral filler containing graft peroxy groups, has the formula:

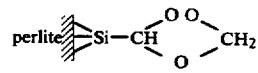

The content of active oxygen defined iodometrically is as follows: found—0.80% by weight, calculated 0.80% by weight.

EXAMPLE 13

The procedure of Example 4 hereinbefore is repeated, except that the ozonation is effected in a medium of Freon 113 (trifluorotrichloroethane) at a temperature of −40° C. The product obtained after ozonation, i.e. mineral filler containing graft peroxy groups has the formula:

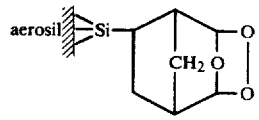

The content of active oxygen determined iodometrically is as follows: found—1.06% by weight, calculated—1.11% by weight.

EXAMPLE 14

The process is conducted in a manner similar to that of Example 8 hereinbefore, except that the ozonation is conducted in a medium of methylene chloride at a temperature of 10° C. The product resulting from ozonation, i.e. mineral filler containing graft peroxy groups has the formula:

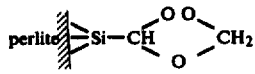

The content of active oxygen determined iodometrically is as follows: found—0.79% by weight, calculated—0.80% by weight.

EXAMPLE 15

The procedure of the foregoing Example 8 is repeated, except that a ozonation is conducted in a medium of chloroform at the temperature of 0° C. The product resulting from ozonation, i.e. mineral filler containing graft peroxy groups has the formula:

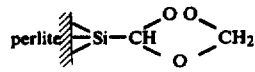

The content of active oxygen determined iodometrically is as follows: found—0.76% by weight; calculated—0.80% by weight.

EXAMPLE 16

Into a reaction vessel provided with a reflux condenser there are charged 100 g of glass fiber treated in a manner similar to that described in the foregoing Example 5, added with 1,000 ml of toluene containing 20 g of vinyltri(2-ethoxy-ethoxy)silane and the reaction mixture is maintained at a temperature of 110° C. for a period of 6 hours. On completion of the reaction the product is separated by filtration, washed with petroleum ether and the resulting product, i.e. mineral filler is dried at a temperature of 120° C. The product has the formula:

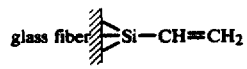

The amount of graft unsaturated groups is equal to 2% by weight of the filler. 100 g of the silanized glass fiber are placed into a reaction vessel, contacted with 1,000 ml of 1,2-dichloroethane and an ozone-oxygen mixture containing 4 to 6 vol.% of ozone is bubbled therethrough at a rate of from 40 to 60 l/hr at the temperature of −20° C. for one hour. On completion of the reaction a product is separated by filtration and dried at a temperature of from 20° to 30° C. to constant weight. The product, i.e. mineral filler containing graft peroxy groups has the formula:

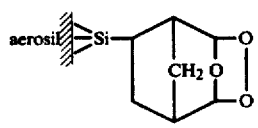

The content of active oxygen determined iodometrically is as follows: found—1.02% by weight, calculated—1.07% by weight.

EXAMPLE 17

Into an autoclave with the capacity of 1 liter there are charged 100 g of perlite with a composition described in Example 8 hereinbefore, 20 g of vinyldichloromethylsilane; the autoclave is set under vacuum to a residual pressure of $1.33 \cdot 10^2$ Pa and heated at a temperature of 150° C. for 10 hours (pressure in the autoclave is $4 \cdot 10^5$ Pa). On completion of the reaction the excessive amount of vinyldichloromethylsilane is washed out with dry petroleum ether and dried at a temperature of 120° C. The resulting mineral filler has the formula:

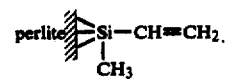

The content of unsaturated groups is 1.76% by weight of the filler.

Ozonation is conducted following the procedure of Example 1. The product resulting from ozonation, i.e. mineral filler containing graft peroxy groups has the formula:

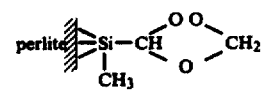

The content of active oxygen determined iodometrically is as follows: found—1.00% by weight, calculated—1.05% by weight.

EXAMPLE 18

The procedure of the foregoing Example 17 is repeated, except that as the organosilicon compound vinylethyldichlorosilane is used. The product resulting from ozonation, i.e. mineral filler containing graft peroxy groups has the formula:

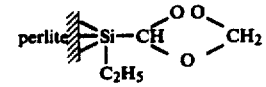

The content of active oxygen determined iodometrically is as follows: found—0.6% by weight, calculated—0.93% by weight.

What is claimed is:

1. A process for producing mineral fillers with graft peroxide groups for polymers comprising treatment of mineral fillers which have been dried to a constant weight, at a temperature within the range of from 50° to 150° C. under a pressure of from $1.33 \cdot 10^2$ to $4 \cdot 10^5$ Pa, (1 mm Hg to 4 atm) with silicone compounds selected from the group consisting of compounds of the formula:

$$R_{4-y}SiX_y \text{ or } R'R_{3-z}SiX_z, \text{ wherein}$$

R is selected from the group consisting of vinyl, allyl, norbornyl,
X is selected from the group consisting of chlorine, an alkoxy or acyloxy,
y = 1–3
z = 1–2
R' is selected from the group consisting of methyl, ethyl, propyl, followed by separation of the mineral filler containing graft unsaturated groups from the resulting reaction mixture, drying thereof and ozonization with an ozone-oxygen mixture containing 4 to 6 vol.% of ozone at a temperature within the range of from −40° to +20° C.

2. A process as claimed in claim 1, wherein said ozonization is performed in a medium of a compound selected from the group consisting of a liquid saturated hydrocarbon and a haloderivative thereof and the mineral filler containing graft peroxide groups is recovered.

* * * * *